United States Patent [19]

Sneddon et al.

[11] Patent Number: 5,612,013

[45] Date of Patent: Mar. 18, 1997

[54] METHOD FOR SYNTHESIS OF BORAZINE

[75] Inventors: Larry G. Sneddon, Newtown Square; Thomas Wideman, Philadelphia, both of Pa.

[73] Assignee: Trustees of the University of Pennsylvania, Philadelphia, Pa.

[21] Appl. No.: 386,930

[22] Filed: Feb. 10, 1995

[51] Int. Cl.$^6$ ................................................. C01B 35/14
[52] U.S. Cl. ............................................ 423/285; 423/409
[58] Field of Search ................................. 423/285, 290, 423/409

[56] References Cited

U.S. PATENT DOCUMENTS

| 4,150,097 | 4/1979 | Hough et al. | 423/285 |
| 5,399,377 | 3/1995 | Economy et al. | 423/285 |

FOREIGN PATENT DOCUMENTS

| 259848 | 2/1980 | U.S.S.R. | 423/285 |

OTHER PUBLICATIONS

"The Merck Index", Eight edition, 1968, pp. 364, 1026 (no month).

Brown, C.A. et al, "B–Trichloroborazole", *J. Am. Chem. Soc.* Jul. 1955, 3699–3700.

Burg, A., "Displacement of Diborane from Pentaborane (9) by Strong Molecular Bases", *Inorg. Chem.* 1973, 12, 1448–1450.

Dahl, G. et al., "The Convenient Laboratory Preparation of Borazole", *J. Inorg. Nucl. Chem.* 1960, 12, 380–381, No month.

Emeleus, H. et al., "Use of Cobalt Catalyst in the Preparation of Borazole and tis Derivatives", *J. Chem. Soc.*, 1959, 1306–1307.

Haworth, D., "Synthesis of Borazine and N–Trisubstituted Borazines", *Chem. and Ind.* (London) May 1960, 559–560.

Hohnstedt, L. et al., "Preparation of N–Trisubstituted Borazines by Reduction of B–Trichloroborazines", *J. Am. Chem. Soc.* Jan. 1960, 82, 89–92.

Hu, M.G. et al., "New Synthetic Approaches to Ammonia–Borane and its Deuterated Derivatives", *J, Inorg. Nucl. Chem.* 1977, 39, 2147–2150, No month.

Hu, M.G. et al., "The Thermal Decomposition of Ammonia–Borane", *Thermochimica Acta* 1978, 23, , 249–255, No month.

Mikheeva, V. and Markina, "Synthesis of Borazole by the Reaction Between Lithium Borohydride and Ammonium Chloride", *J. Inorg. Chem., USSR* 1956, 56–63, No month.

Muetterties, E. ed., "Boron Hydride Chemistry", Chapter 7, pp. 241–272, Academic Press, New York, 1975, No month.

Niedenzu, K. and Dawson, "Inorganic Syntheses: Amino and Imino Derivatives of Metals and Metalloids", *Inorg. Synth.* 1967, 10, 142–144, No month.

Schaeffer, R. et al, "Preparation of Borazole by the Reduction of Tricholoroborazole", *J. Am. Chem. Soc.* Jun. 1954, 3303–3306.

Schlesinger, H. et al., "Hydrides of Boron. IX. The Preparation of Some Methyl Triborine Triamines", *J. Am. Chem. Soc.* Jun. 1938, 60, 1296–1300.

Schlesinger, H. et al., "The Preparation and Preliminary Study of the New Compound $B_2H_7N$", *J. Am. Chem. Soc.* Oct. 1938, 60, 2297–2300.

Schlesinger, H. et al., "The Preparation of Borazole and its Reactions with Boron Halides", *J. Am. Chem. Soc.* Apr. 1951, 73, 1612–1614.

Shore, S. and Parry, "The Crystalline Compound Ammonia–Borane, $H_3NBH_3$", *J. Am. Chem. Soc.* Nov. 1955, 77, 6084–6085.

Shore, S. and Boddeker, "Large Scale Synthesis of $H_2B(NH_3)_2^+ + BH_2^-$ and $H_3NBH_2$", *Inorganic Chemistry* Jun. 1964, 3(6), 914–915.

Volkov, V. et al., "Preparation of Borazine by the Reaction of Sodium Tetrahydroborate wht Ammonium Chloride", *J. Inorg. Chem.* 1970, 15, 1510–1513, No month.

Volkov, V. et al., "Production of Borazine by the Reaction of Sodium Tetrahydroborat With Ammonium Chloride with the Use of the Preliminary Reagent Mixture Mechanical Activation", *Siberian Chemistry Journal* 1983, 3, 116–123.

Wang, J.S. and Geanangel, "B NMR Studies of the Thermal Decomposition of Ammonia–Borane in Solution", *Inorganica Chimica Acta* 1988, 148, 185–190, No month.

Wiberg, E. et al., "Das anorganische Benzol" $B_3N_3H_6$ *Chem. Ber.* 1940, 73B, 209–232, No month.

Zakharkin, "Ilitschennaja metolika polytschennaya 2,4,6–trichloroborazola"*Metallorg. Khim*, 1993, 6(3), 381–2, No month.

*Primary Examiner*—Ngoc-Yen Nguyen
*Attorney, Agent, or Firm*—Woodcock Washburn Kurtz Mackiewicz & Norris

[57] ABSTRACT

A method for synthesizing borazine in high yields by the reaction of certain ammonium salts, such as ammonium sulfate, and a borohydride, such as sodium borohydride, in solvent at moderate temperatures (e.g., 120°–140° C.) is disclosed.

19 Claims, No Drawings

METHOD FOR SYNTHESIS OF BORAZINE

Support for this invention was provided under NSF Grant CHE-90-01063A04 and DEO Grant DE-FG-02-87ER13.

BACKGROUND OF THE INVENTION

This invention relates to a novel method for synthesizing borazine. Borazine has been recognized as a useful precursor to the ceramic material boron nitride. Although boron nitride is easy to obtain in powder form from the pyrolysis of simple, inexpensive reagents, it is not feasible to convert boron nitride powders into forms such as fibers and coatings. The need for more processible boron nitride has encouraged research groups to seek new ways to obtain these forms. Polymers that contain boron and nitrogen, such as polymers formed from the monomer borazine, offer an attractive approach. See, for example, Paine, R. T. and Sheddon, L. G., "Borazine-based Polymers Close in on Commercial Performance," Chemtech 1994, 29–37. Unfortunately, practical applications of borazine continue to be held back by the absence of an efficient, economical synthetic route.

Borazine was first prepared by Stock (*Chem. Ber.* 1926, 59B, 2215–2223) by the thermal decomposition of the diammoniate of diborane. Borazine has also been observed as a product in several other reactions (e.g., Stock, *Chem. Ber.* 1929, 62B, 90–99; Stock, *Chem. Ber.* 1930, 63B, 2927–2937; Stock, *Chem Ber.* 1932, 65B, 1711–1724; Schlesinger, *J. Am. Chem. Soc.* 1936, 58, 409–414; Schlesinger, *J. Am. Chem. Soc.* 1938, 60, 1296–1300; Schlesinger, *J. Am. Chem. Soc.* 1938, 60, 2297–2300; Wilberg, *Chem. Ber.* 1940, 73B, 209–232; Wilberg, *Naturwissenschaften* 1948, 35, 182–188; Videla, *Proc. Int. Conf. on Peaceful Uses of Atomic Energy*, 1955, 8, 619; Emeleus, *J. Chem. Soc.*, 1959, 1306–1307; Burg, *Inorg. Chem.* 1973, 12, 1448–1450); however, none of these are convenient for laboratory preparations. One of the best laboratory syntheses of borazine has involved the preparation of B-trichloroborazine, (Eq. 1) and its subsequent reduction by metal borohydrides. (Eq. 2.)

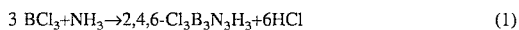

$$3\ BCl_3 + NH_3 \rightarrow 2,4,6\text{-}Cl_3B_3N_3H_3 + 6HCl \quad (1)$$

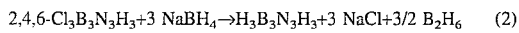

$$2,4,6\text{-}Cl_3B_3N_3H_3 + 3\ NaBH_4 \rightarrow H_3B_3N_3H_3 + 3\ NaCl + 3/2\ B_2H_6 \quad (2)$$

Even with the reported improvements (e.g., Zaharkin, *Metallorg. Khim*, 1993, 6, 381–2), this approach has a number of limitations including relatively small scales, long reaction times, difficult purification, the use of potentially carcinogenic solvents (i.e. chlorobenzene), and requiring the handling of air-sensitive materials, including B-trichloroborazine and the diborane that is generated during the reduction step.

Two larger scale methods for the preparation of borazine have been achieved, but these methods employ equipment or procedures not generally feasible in the laboratory. A commercial procedure is described in U.S. Pat. No. 4,150,097 to Hough et al. In this process, the batch pyrolysis of ammoniaborane dissolved in diglyme was found to produce borazine in 69–71% yields on 0.53 g scales. A more elaborate continuous flow process, involving a heated vertical steel reactor, was then used to make larger quantities of borazine, but the complicated design would be difficult to engineer in the laboratory.

A second procedure is based on the original discovery by Schlesinger (*J. Am. Chem. Soc.* 1951, 73, 1612–1614) that the high temperature (300° C.) solid-state reaction of lithium borohydride and ammonium chloride yields borazine. Mikheeva and Markina (*J. Inorg. Chem., USSR* 1956, 56–63) optimized these reactions and found that yields of 38–41% were obtained with a 2:1 excess of ammonium chloride, but the reaction required constant agitation by an unusual "motorless shaker" Similarly, Volkov (*J. Inorg. Chem.* 1970, 15, 1510–1513) optimized the sodium borohydride and ammonium chloride reaction at 230° C. to produce borazine in yields of 13–23%, but again, an unusual apparatus consisting of a steel reactor and shaker and a metallic nickel trap was required. These solid-state reactions employ inexpensive starting materials, but have the disadvantages of complicated apparatus, variable and low yields and the formation of side products, such as chloroborazine and diborane, which complicate purification and handling.

Haworth (*Chem. Ind. (London)* 1960, 559–560) has reported that the reaction of sodium borohydride and ammonium chloride in etheral solvents at 190°–230° C. gives borazine in 35% yields. When the present inventors repeated this reaction in tetraglyme solution, however, significant amounts of chloroborazine, ammonia, and acetylene were found, necessitating careful, repeated fractionations of the products to give variable yields of 3–40%. There therefore remains a need for a high yield, economical and convenient method for synthesizing borazine.

SUMMARY OF THE INVENTION

It has now been found that borazine can be synthesized in high yields by the reaction of certain ammonium salts, such as ammonium sulfate, and sodium borohydride in solvent at moderate temperatures. This invention, therefore, relates to a method of preparing borazine comprising contacting in solution, and heating, an ammonium salt with a non-halogen anion and an alkali metal borohydride. The method of this invention offers distinct advantages over previously described methods for preparing borazine in that it allows for the preparation of borazine in high yields without complicated apparatus and expensive starting materials.

DETAILED DESCRIPTION OF THE INVENTION

Ammonium salts with non-halogen anions may be used as starting materials in the method of this invention. Preferred ammonium salts are selected from the group consisting of $(NH_4)_2SO_4$, $(NH_4)HSO_4$, and $(NH_4)_2HPO_4$, preferably $(NH_4)_2SO_4$. The alkali metal borohydrides that may be used include sodium, potassium, lithium, and cesium borohydride, preferably, sodium borohydride. The materials are generally used in amounts so that the $BH_4^-/NH_4^+$ molar ratio is in the range of about 20/1 to about 1/20, and ideally about 1/1. The materials are combined in a high-boiling, solvent (i.e., a boiling point higher than the reaction temperature utilized) that is inert to reactants and borazine, preferably ethers such as tetraglyme. The ammonium salt and the borohydride are contacted at a temperature of at least about 100° C., preferably at about 100°–160° C., and more preferably at about 120°–140° C. Reaction is generally complete within three hours, although shorter or longer reaction times may be utilized. Best results have been obtained using finely powdered $(NH_4)_2SO_4$ and sodium borohydride, in a 0.65/1 $BH_4/NH_4$ molar ratio. As described in the Example below, the borazine is preferably removed continuously in vacuo as it is formed and may be produced in 10–20 gram scales, in 58–60% yields.

The fact that the reactions of borohydride with the ammonium salts such as $(NH_4)_2SO_4$ proceed at lower temperatures (120°–140° C.) than those with $NH_4Cl$ (190°–230° C.) appears to eliminate any solvent reduction by-products as well as any chloroborazine side-products. Indeed, since borazine is the only volatile product observed in the reaction, the compound is obtained in excellent purity even without vacuum fractionation. Thus, the $(NH_4)_2SO_4$/solution procedure is clearly favored over the previous solid-state syntheses, since only normal laboratory equipment is required, the product is obtained in excellent purity without extensive fractionations, and significantly higher yields are obtained.

This invention therefore discloses an excellent route to the synthesis of borazine. The preparation may be run either by the continuous addition of the solids to a hot solvent (facilitating larger scale preparations) or by the gradual warming of the solids in solution. The reaction is particularly attractive due to the inexpensive starting materials and now enables the convenient, economical generation of borazine.

This invention is further illustrated by the following examples, which are meant to illustrate, but not limit, the scope of the invention. In these examples, all synthetic manipulations were carried out using standard vacuum or inert atmosphere techniques as described by Shriver, *The Manipulation of Air Sensitive Compounds*, 2nd Ed., Wiley: New York, 1986. Sodium borohydride and ammonium sulfate were purchased from Aldrich and used as received. Tetraglyme was vacuum distilled from molten sodium shortly before use.

EXAMPLE

Preparation of Borazine from Sodium Borohydride and Ammonium Sulfate

In a typical reaction, a mixture of 30.7 g (0.81 mol) of $NaBH_4$ and 82.3 g (0.62 mol) of $(NH_4)_2SO_4$ were mixed with 350 mL of tetraglyme in a 2 L, three-neck round bottomed flask which was fitted with a thermometer and reflux condenser. The exit of the reflux condenser was connected to a standard vacuum line (see, e.g., Shriver, page 101) equipped with four liquid-nitrogen traps. The reaction mixture was gradually warmed to 135° C. over the course of 1 hour and held at this temperature for an additional hour under a dynamic vacuum that was maintained at 2–5 torr by the continuous removal of the evolved hydrogen and borazine through the vacuum line. Following the reaction, the borazine that had been retained in the liquid-nitrogen traps was further purified by a single vacuum fractionation through a –45°, –78°, –196° C. trap-series to give (–78° C. trap) 13.1 g (0.16 mol, 59.9% based on starting $BH_4$) of borazine. No other products were detected in the IR, $^{11}B$ and $^1H$ NMR, or GC/MS spectra of the product and its vapor pressure (85 torr at 0° C.) matched the literature value (Stock, *Hydrides of Boron and Silicon*, Ithaca: Cornell University Press, 1933, p. 94), indicating that the borazine was obtained in excellent purity.

Following the completion of the reaction, analysis of the reaction mixture by $^{11}B$ NMR showed no discrete boron-containing species remained in the tetraglyme. In other experiments, these reaction mixtures were used again for a second preparation and were found to give slightly increased yields.

In an alternate procedure, an intimate mixture of 21.8 g (0.58 mol) of $NaBH_4$ and 56.2 g (0.43 mol) of $(NH_4)_2SO_4$ was dropped into 350 mL of tetraglyme at 135° C. over 1 hour and then allowed to react at that temperature for an additional 2 hour. Fractionation of the material retained in the liquid-nitrogen traps gave 8.3 g (0.10 mol, 53.8%) of borazine.

What is claimed is:

1. A method for preparing borazine consisting essentially of contacting, at a temperature of at least about 100° C. and in solution, an ammonium salt with a non-halogen anion selected from the group consisting of $(NH_4)_2SO_4$, $(NH_4)HSO_4$, and $(NH_4)_2HPO_4$ and an alkali metal borohydride.

2. The method of claim 1 wherein said alkali metal borohydride is selected from the group consisting of sodium borohydride and lithium borohydride.

3. The method of claim 1 wherein said ammonium salt is $(NH_4)_2SO_4$.

4. The method of claim 1 wherein said alkali metal borohydride is sodium borohydride.

5. The method of claim 3 wherein said alkali metal borohydride is sodium borohydride.

6. The method of claim 1 wherein the ratio of ammonium salt to borohydride is such that the $BH_4^-/NH_4^+$ molar ratio is in the range of about 20/1 to about 1/20.

7. The method of claim 6 wherein the ratio of ammonium salt to borohydride is such that the $BH_4^-/NH_4^+$ molar ratio is about 1/1.

8. The method of claim 1 wherein said temperature is in the range of about 100°–160° C.

9. The method of claim 8 wherein said temperature is in the range of about 120°–140° C.

10. A method for preparing borazine consisting of contacting, at a temperature of at least about 100° C. and in solution, an ammonium salt with a non-halogen anion selected from the group consisting of $(NH_4)_2SO_4$, $(NH_4)HSO_4$, and $(NH_4)_2HPO_4$ and an alkali metal borohydride, and recovering said borazine.

11. A method for preparing borazine consisting essentially of contacting, at a temperature of at least about 100° C. and in solution and in an inert solvent, an ammonium salt with a non-halogen anion selected from the group consisting of $(NH_4)_2SO_4$, $(NH_4)HSO_4$, and $(NH_4)_2HPO_4$ and an alkali metal borohydride, wherein said solvent has a boiling point above said temperature of said reaction.

12. The method of claim 11 wherein said solvent is an ether.

13. The method of claim 12 wherein said solvent is tetraglyme.

14. The method of claim 11 wherein said ammonium salt is $(NH_4)_2SO_4$, said borohydride is sodium borohydride, said solvent is tetraglyme, and said ammonium salt and said borohydride are contacted at a temperature of at least about 100° C.

15. The method of claim 13 wherein said ammonium salt and said borohydride are contacted at a temperature in the range of about 120°–140° C.

16. The method of claim 13 wherein the ratio of ammonium salt to borohydride is such that the $BH_4^-/NH_4^+$ molar ratio is in the range of about 20/1 to about 1/20.

17. The method of claim 16 wherein the ratio of ammonium salt to borohydride is such that the $BH_4^-/NH_4^+$ molar ratio is about 1/1.

18. The method of claim 17 wherein the ratio of ammonium salt to borohydride is such that the $BH_4^-/NH_4^+$ molar ratio is in the range of about 20/1 to about 1/20.

19. The method of claim 18 wherein the ratio of ammonium salt to borohydride is such that the $BH_4^-/NH_4^+$ molar ratio is about 1/1.

* * * * *